(12) United States Patent
Zeng et al.

(10) Patent No.: US 9,780,604 B1
(45) Date of Patent: Oct. 3, 2017

(54) INDUCTIVE BATTERY POWER TRANSFER FOR POWERING WIRELESS SENSORS FOR CONSTRUCTION AND AGRICULTURAL EQUIPMENT

(71) Applicant: Sauer-Danfoss Inc., Ames, IA (US)

(72) Inventors: Jack Zeng, Eden Prairie, MN (US); Kevin W. Bloms, Minnetonka, MN (US)

(73) Assignee: Danfoss Power Solutions Inc., Ames, IA (US)

( * ) Notice: Subject to any disclaimer, the term of this patent is extended or adjusted under 35 U.S.C. 154(b) by 911 days.

(21) Appl. No.: 13/625,018

(22) Filed: Sep. 24, 2012

(51) Int. Cl.
*H01F 38/00* (2006.01)
*H02J 50/10* (2016.01)
(52) U.S. Cl.
CPC .................... *H02J 50/10* (2016.02)
(58) Field of Classification Search
USPC ........................................................ 307/104
See application file for complete search history.

(56) References Cited

U.S. PATENT DOCUMENTS

| | | | |
|---|---|---|---|
| 8,903,456 B2* | 12/2014 | Chu | H04M 19/04 320/106 |
| 2008/0030355 A1* | 2/2008 | Lange | B23Q 1/0009 340/635 |
| 2009/0222177 A1 | 9/2009 | Lindskov | |
| 2013/0289334 A1* | 10/2013 | Badstibner et al. | 600/16 |

\* cited by examiner

*Primary Examiner* — Rexford Barnie
*Assistant Examiner* — Dru Parries
(74) *Attorney, Agent, or Firm* — Zarley Law Firm, P.L.C.

(57) ABSTRACT

A wireless sensor assembly that includes a battery pack and a wireless sensor. The battery pack is placed in spaced relation to the wireless sensor and inductively powers the wireless sensor utilizing primary and secondary resonant coils presented within the battery pack and wireless sensor. The wireless sensor additionally has super capacitors therein to continue to operate the wireless sensor during the changing of the battery pack.

20 Claims, 4 Drawing Sheets

INDUCTIVE BATTERY POWER TRANSFER FOR POWERING WIRELESS SENSORS FOR CONSTRUCTION AND AGRICULTURAL EQUIPMENT

BACKGROUND OF THE INVENTION

This invention relates to wireless sensors for construction and agricultural equipment. More specifically the present invention relates to a wireless sensor assembly that utilizes an inductive battery power transfer for powering the wireless sensor.

Sensors are used on agricultural and construction equipment for many different reasons. Typically, the sensor is placed on an agricultural or construction machine and the sensor is battery powered utilizing a battery that is physically in contact with the wireless sensor via contacts. Batteries with contacts are susceptible to dirt, debris, and other elements such as oxidization, short circuiting and wear and tear. There are many sources of these contaminants on a construction or agricultural job site that interfere with a good battery connection to the sensor including water, cement dust, dirt, diesel fuel, and the like. These batteries are exposed to these numerous contaminants when the batteries are swapped in the field with fully recharged batteries. Unfortunately, replacing these batteries in the field is required because of operation requirements of construction and agricultural projects and the wireless nature of these sensors.

Thus, a need in the art exists for eliminating the problems associated with utilizing a battery with physical contacts. Further, a need exists for a battery that can be quickly recharged and does not cause the wireless sensor to stop functioning as a result of the changing of the battery.

Thus, a principal object of the preset invention is to provide a wireless sensor assembly that is unaffected by dust and debris.

Yet another object of the present invention is to provide a wireless sensor assembly that is easy to handle, use and replace.

These and other objects, features, and advantages will become apparent from the specification and claims.

BRIEF SUMMARY OF THE INVENTION

A wireless sensor assembly comprising a battery pack having a primary resonant coil. The wireless sensor assembly additionally has a wireless sensor with a wireless sensor power receiver with a secondary resonant coil that is in electrical communication with the first primary resonant coil of the battery pack. The wireless sensor additionally has a super capacitor therein such that the wireless sensor is able to stay powered for a given amount of time after the battery pack has been removed. This allows the battery pack to be replaced without loss of power or function of the wireless sensor.

DETAILED DESCRIPTION OF THE PREFERRED EMBODIMENT

Figure 1:
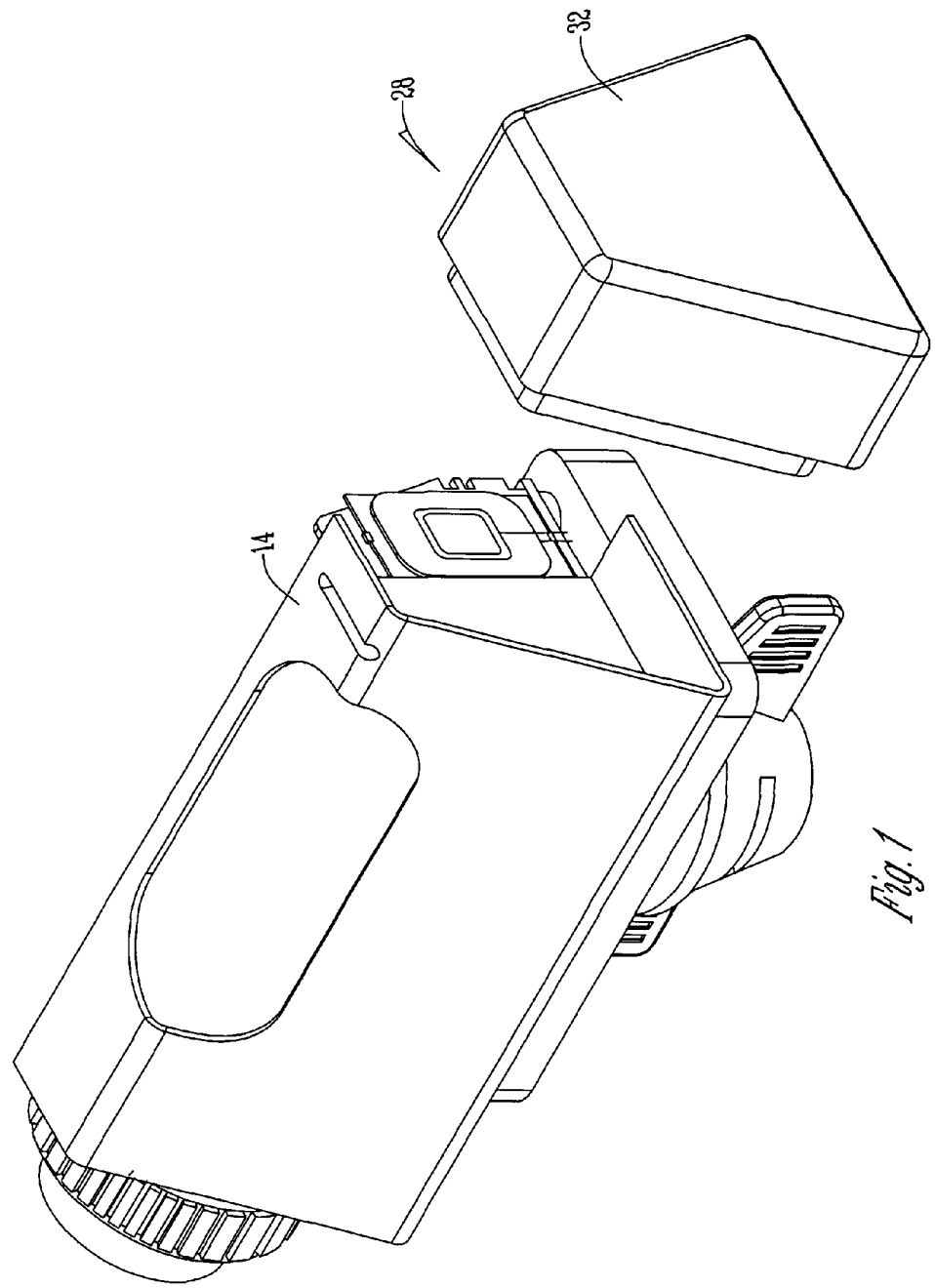
FIG. 1 is a perspective view of a wireless sensor assembly.
Figure 2:
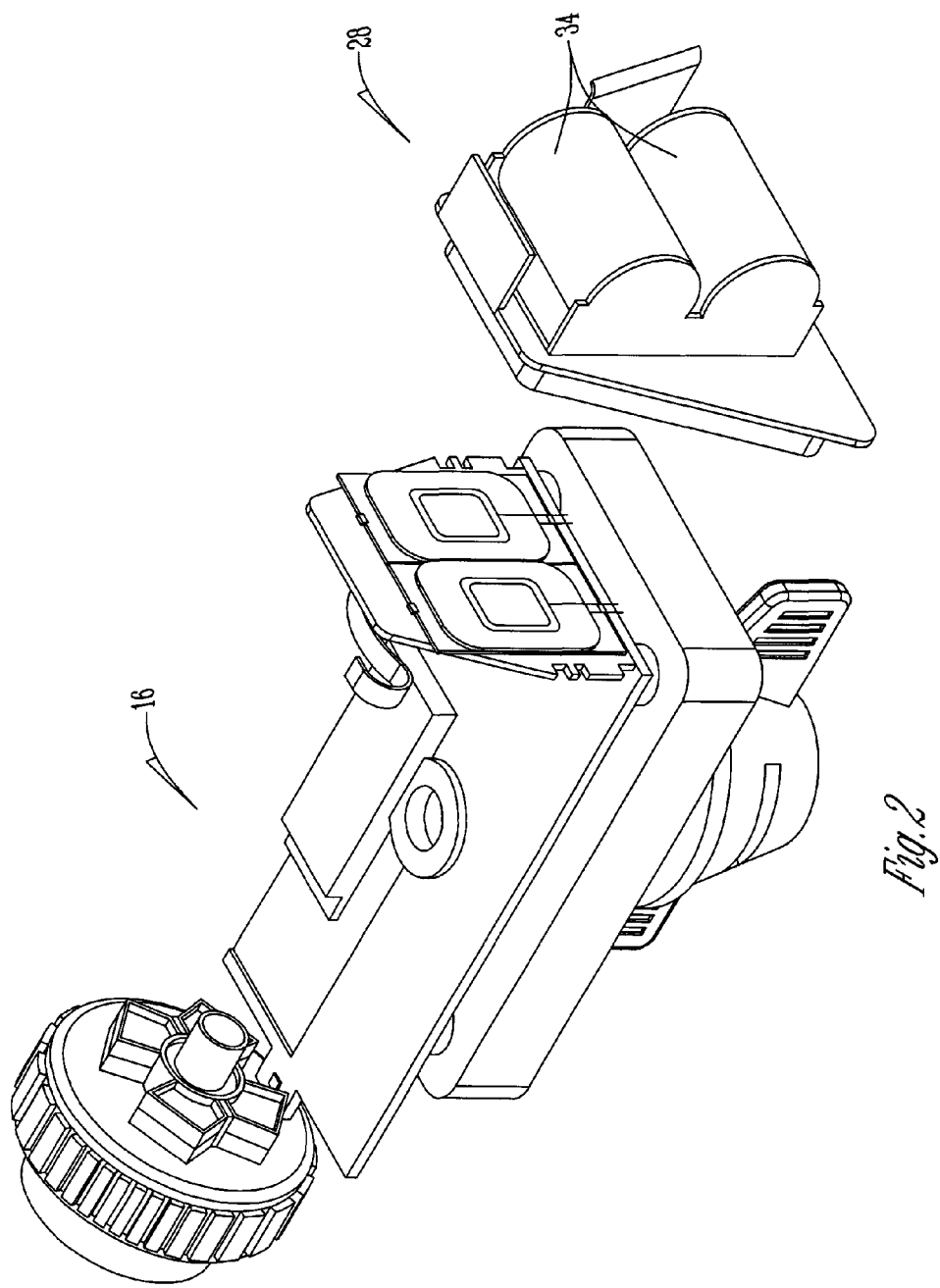
FIG. 2 is a cut-away perspective view of a wireless sensor assembly.
Figure 3:
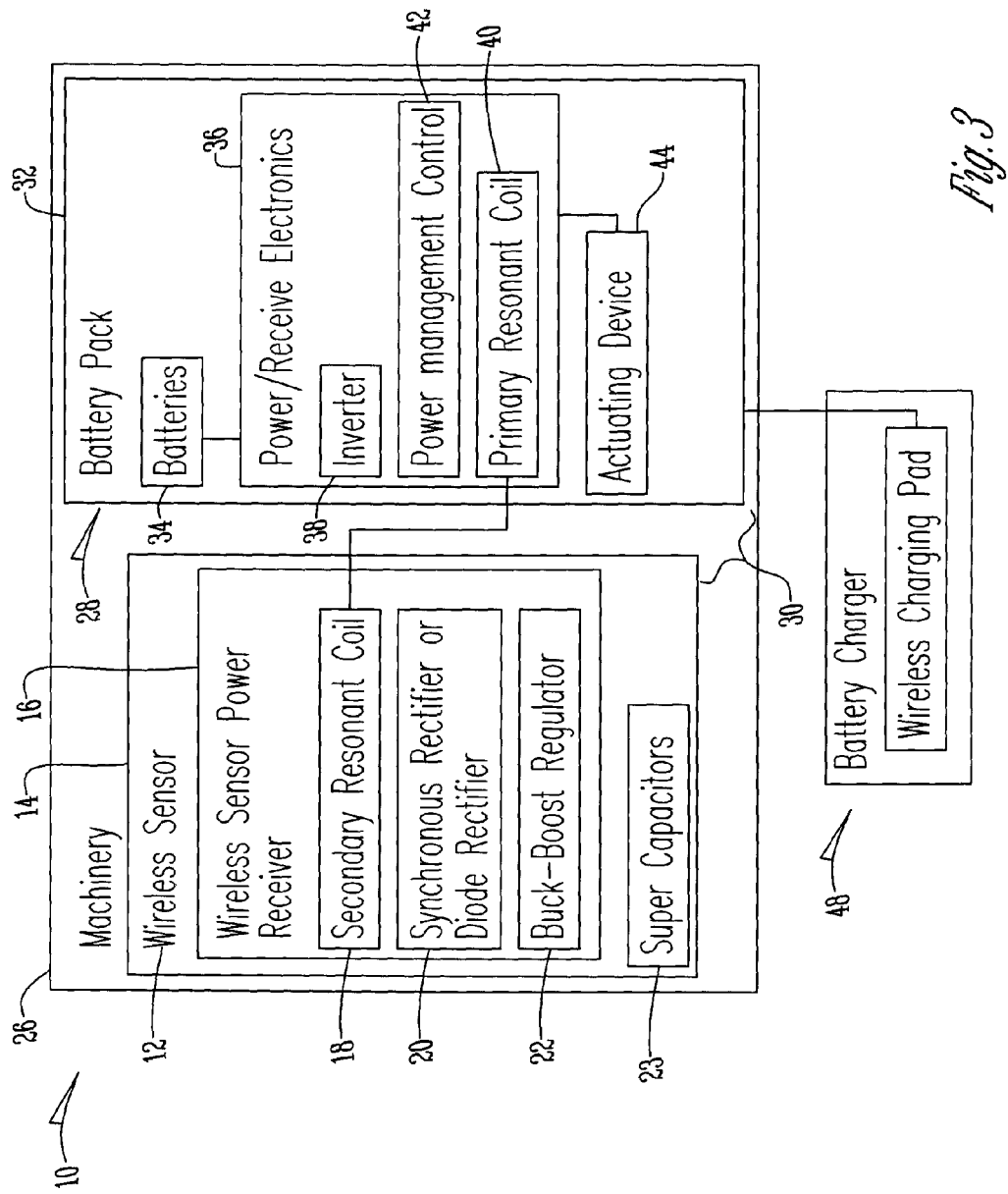
FIG. 3 is a schematic diagram of a wireless sensor assembly.
Figure 4:
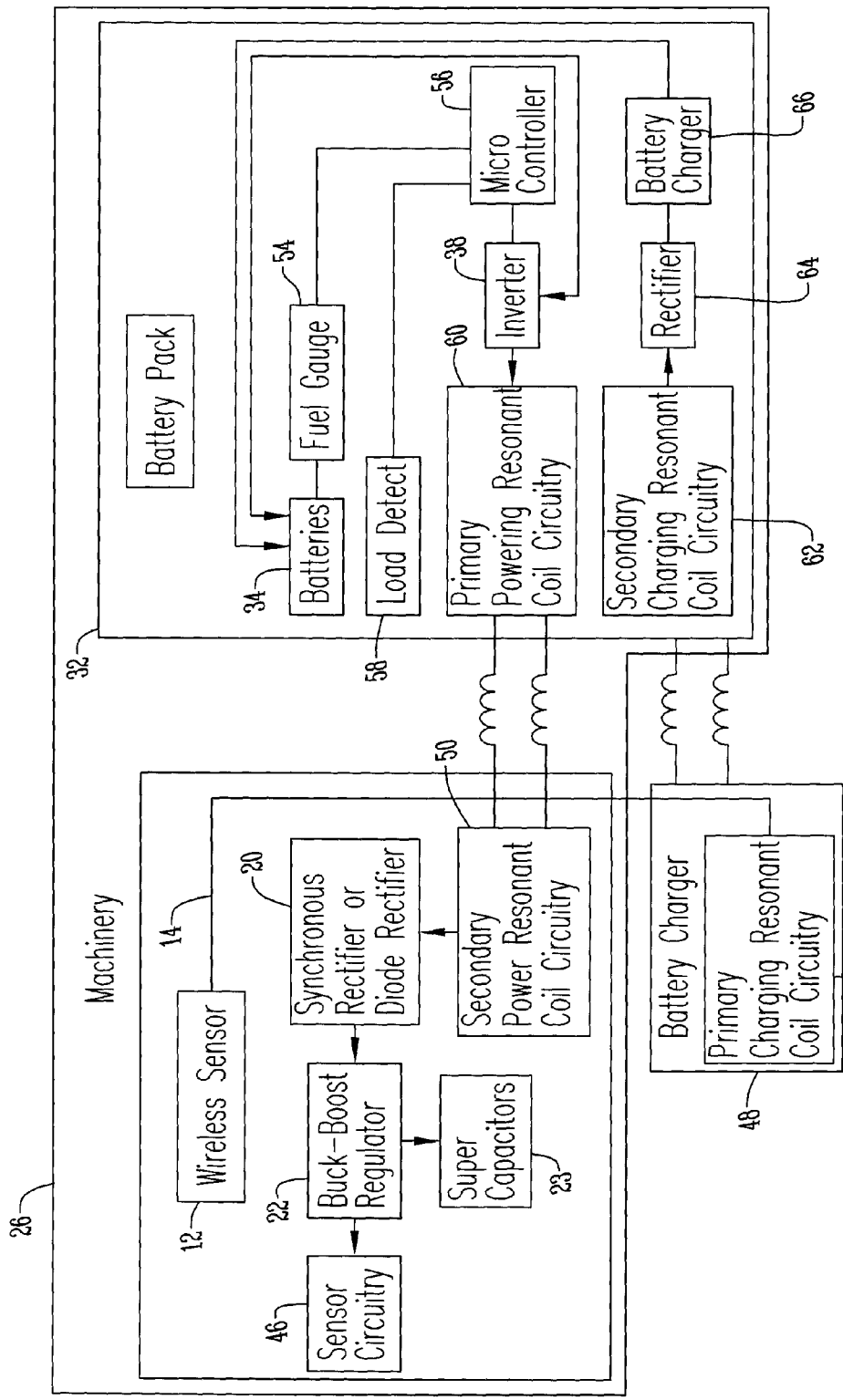
FIG. 4 is a schematic diagram of a wireless sensor assembly.

The figures show a wireless sensor assembly 10 that includes a wireless sensor 12 that has a wireless sensor housing 14 that houses a wireless sensor power receiver 16. The wireless sensor power receiver 16 includes a resonant coil 18, synchronous rectifier or diode rectifier 20, a buck boost regulator 22 and super capacitors 23. The rotating element 24 is attached to a perma magnet (not shown) to create a magnetic field that the Hall Effect measures. The angle of turn correlates to the field intensity. The primary function of sensor is to measure an angle. The wireless sensor 12 is detachably placed on machinery 26 such as agricultural machinery or construction equipment and/or machinery for use.

A battery pack 28 is also part of the wireless sensor assembly 10 and is placed on the machinery 26 in spaced relation to the wireless sensor 12 to form a gap 30 there between. The battery pack 28 similar to the wireless sensor 14 has a battery pack housing 32 to prevent dust and dirt from entering the interior of the housing 32. Sealed within the battery pack housing 32 are a plurality of batteries 34 and battery power/receiver electronics 36. The battery power/receiver electronics 36 include an inverter 38, a resonant coil 40 and a power management control 42. In a preferred embodiment the resonant coil 40 of the battery pack 28 is considered a primary resonant coil while the resonant coil 18 of the wireless is a secondary resonant coil.

An actuating device 44 such as a switch or a button is also disposed within the battery pack housing 32 and when actuated the switch determines if a load is presented on the wireless sensor 12 and if so the battery pack 28 begins transmitting power to the wireless sensor 12. If no load exists, power from the battery pack 28 is stopped. The battery pack is able to transmit the "state of charge of the battery" or "state of battery charge" to the wireless sensor 12 by providing an interrupted power transmission signal wherein the length of the interval is proportional to the state of the battery charge.

The battery pack and charger communicate using the bqTesla part that includes a charger and a receiver. The method is either phase shifting or amplitude keying. More specifically the battery pack 28 is placed on top of the battery charger 48. In one embodiment the battery charger 48 is a wireless charging pad. The bqTesla charger detects the bqTesla receiver and charging occurs automatically.

In operation, the battery pack 28 is placed adjacent to but in spaced relation to the wireless sensor 12, separated by space 30. Power transfer to the wireless sensor 12 is initiated by pressing or actuating the actuating device 44 of the battery pack 28. If the battery pack 28 senses a sensor load, the battery pack 28 begins to transmit power; otherwise the power transfer is to be stopped such as when in idle. The battery pack 28 transfers "state of battery charge" to the wireless sensor 12 by interrupting the power transfer signal to the wireless sensor 12. The length of the power shutdown is proportional to the state of battery charge, but not long enough to drain the super caps.

The wireless sensor 12 has enough super capacitors 23 to temporarily power the wireless sensor 12 allowing the battery pack 28 to be replaced without interrupting sensor operation. The super capacitors 23 also power the sensor 12 when the battery pack 28 interrupts battery power during the transfer of "state of battery charge" data.

In an alternative embodiment, the wireless sensor 12 includes sensor circuitry 46 and second powering resonant coil circuitry 50. The battery charger 48 includes a primary charging resonant coil circuitry 52. The battery pack 32 includes a fuel gauge 54 connected to the batteries 34 and microcontroller 56. The microcontroller is connected to a load detector 58 and the inverter 38. The inverter 38, which is connected to the batteries 34, is also connected to primary powering resonant coil circuitry 60.

Secondary charging resonant coil circuitry 62 is connected to a rectifier 64 that is connected to a battery charger 66. The battery charger 66 is connected to the batteries 34.

In operation the battery pack 32 is connected to battery charger 48. Current is transferred from primary charging resonant coil circuitry 52 to the secondary charging resonant coil circuitry 62 on to the rectifier 64, then to battery charger 66 and then to batteries 34. Current is transferred from the primary powering resonant coil circuitry 60 to the secondary powering resonant coil circuitry based upon the load detected. If the current is too high or too low a signal is sent from the load detector 58 to the microcontroller 56 which prevents current from transferring. When the load detector 58 signal indicates that the current is within an acceptable range, current is transferred from the battery pack 32 to the wireless sensor 12.

Thus provided is a wireless sensor assembly that provides inductive powering of the wireless sensor 12 from a contactless battery pack 28. The contactless battery pack 28 is not affected by dirt of other contaminants on construction and agricultural sites as a result of the battery pack housing 32 and not having terminals or leads that must connect to the wireless sensor 12. Load detection of the sensor 12 through use of the bqTesla part also provides improvement over the prior art.

Further, the wireless sensor assembly 10 transmits "state of charge" to the wireless sensor 12 from the battery pack 28 providing additional information not previously contemplated. Further, as a result of the use of the super capacitor 23 the battery pack 28 can be swapped out or changed without interrupting the operation of the wireless sensor. Thus, at the very least all of the stated objectives have been met.

It will be appreciated by those skilled in the art that other various modifications could be made to the device without departing from the spirit and scope of this invention. All such modifications and changes fall within the scope of the claims and are intended to be covered thereby.

What is claimed:

1. A wireless sensor assembly comprising:
 a battery pack detachably placed on machinery having a primary resonant coil;
 a wireless sensor detachably placed on machinery having a wireless sensor power receiver with a secondary resonant coil that is in electric communication with the first resonant coil;
 said wireless sensor having a super capacitor;
 wherein the battery pack inductively powers the wireless sensor;
 wherein the wireless sensor assembly is detachably connected to a member selected from the group consisting of an agricultural machine, a construction machine, and a construction equipment.

2. The assembly of claim 1 wherein the battery pack has an actuating device that when actuated detects a load on the wireless sensor to transfer power to the wireless sensor.

3. The assembly of claim 1 further comprising a battery charger that includes a wireless charging pad.

4. The assembly of claim 1 wherein the battery pack transmits a state of battery charge to the wireless sensor by interrupting a power transfer signal to the wireless sensor.

5. The assembly of claim 1 wherein the length of the interruption of the power signal is proportional to the state of battery charge.

6. The assembly of claim 1 wherein the super capacitor operates the wireless sensor when the battery pack is removed.

7. A wireless sensor assembly, comprising:
 a battery pack having primary powering resonant coil circuitry; and
 a wireless sensor configured to measure an angle having secondary powering resonant coil circuitry, wherein the battery pack inductively powers the wireless sensor
 wherein the wireless sensor assembly is detachably connected to a member selected from the group consisting of an agricultural machine, a construction machine, and a construction equipment.

8. The assembly of claim 7 wherein the battery pack has a load detector.

9. The assembly of claim 7 wherein the battery pack powers the wireless sensor based upon a load sensed by the load detector.

10. A wireless sensor assembly, comprising:
 a battery pack detachably placed on machinery having a micro-controller connected to a load detector;
 a wireless sensor detachably placed on machinery:
 wherein the micro-controller wirelessly transfers current from the battery pack to the wireless sensor based upon a signal sent from the load detector;
 wherein the wireless sensor assembly is detachably connected to a member selected from the group consisting of an agricultural machine, a construction machine, and a construction equipment.

11. The assembly of claim 10 wherein the wireless sensor includes sensor circuitry and powering resonant coil circuitry.

12. The assembly of claim 10 further comprising a battery charger connected to the battery pack.

13. The assembly of claim 12 wherein the battery charger includes a primary charging resonant coil circuitry.

14. The assembly of claim 10 wherein the battery pack has a fuel gauge connected to a plurality of batteries and the micro-controller.

15. The assembly of claim 12 wherein the battery charger is connected to a rectifier that is connected to a secondary charging resonant coil circuitry.

16. The assembly of claim 15 wherein the battery charger is connected to a plurality of batteries and current is transferred from the primary charging resonant coil circuitry to the secondary charging resonant coil circuitry to the rectifier, to the battery charger and onto the plurality of batteries.

17. The assembly of claim 1 wherein the wireless sensor is configured to measure an angle.

18. The assembly of claim 1 having a wireless sensor housing that houses a wireless sensor power receiver.

19. The assembly of claim 1 having a battery pack housing that houses the battery pack.

20. The assembly of claim 1 wherein the battery pack is placed on the member of the group in spaced relation to the wireless sensor to form a gap.

\* \* \* \* \*